United States Patent [19]

Orain

[11] Patent Number: 4,565,540
[45] Date of Patent: Jan. 21, 1986

[54] TRIPOD HOMOKINETIC JOINT HAVING SWIVELLING ROLLERS

[75] Inventor: Michel A. Orain, Conflans Sainte Honorine, France

[73] Assignee: Glaenzer Spicer, Poissy, France

[21] Appl. No.: 597,820

[22] Filed: Apr. 10, 1984

Related U.S. Application Data

[63] Continuation of Ser. No. 377,999, May 13, 1982, abandoned.

[30] Foreign Application Priority Data

Jun. 1, 1981 [FR] France ................. 81 10799

[51] Int. Cl.4 .......................................... F16D 3/24
[52] U.S. Cl. ..................... 464/111; 464/124; 464/905
[58] Field of Search ............ 308/212, 213, 215; 464/111, 123, 124, 132, 905; 384/565, 568

[56] References Cited

U.S. PATENT DOCUMENTS

| | | | |
|---|---|---|---|
| 1,910,184 | 5/1933 | Scribner | 308/215 X |
| 2,142,474 | 1/1939 | Langhaar | 308/215 X |
| 3,818,721 | 6/1974 | Wahlmark | 464/111 |
| 4,192,154 | 3/1980 | Nakamura et al. | 464/111 |
| 4,379,706 | 4/1983 | Otsuka et al. | 464/111 |

FOREIGN PATENT DOCUMENTS

| | | | |
|---|---|---|---|
| 55-54721 | 4/1980 | Japan | 464/111 |
| 6399 | of 1914 | United Kingdom | 308/213 |

Primary Examiner—Stuart S. Levy
Assistant Examiner—Daniel P. Stodola
Attorney, Agent, or Firm—Wenderoth, Lind & Ponack

[57] ABSTRACT

Each arm of a tripod element of a joint has a spherical region. A roller maintained in the plane of two runways therefor provided in a barrel of the joint and having a convex toric inner surface is mounted on the spherical region by means of a ring arrangement of rolling elements having a periphery which has a curvilinear concave shape in axial section of the rolling elements. The mutual contact between the rolling elements prevents the rollers from coming away from the spherical regions.

5 Claims, 15 Drawing Figures

TRIPOD HOMOKINETIC JOINT HAVING SWIVELLING ROLLERS

This application is a continuation of now abandoned application Ser. No. 377,999, filed May 13, 1982.

BACKGROUND OF THE INVENTION

The present invention relates to a tripod homokinetic joint of the type having a tripod element, an element provided with runways and three rollers mounted to swivel on spherical surfaces of the arms of the tripod element and axially movable relative to such arms.

In the case of freely slidably joints, this arrangement avoids the inclination of the rollers relative to the runways when the joint operates at an angle and, consequently, eliminates a cause of friction which occurs in conventional tripod joints having rollers which are mounted to rotate and slide on the arms of the tripod element. However, the arrangements proposed (see for example French Pat. No. 2 422 064 or DE-OS. No. 2 748 044), do not completely eliminate this friction, since friction remains when the rollers swivel and slide. Further, these arrangements employ complicated constructions.

SUMMARY OF THE INVENTION

An object of the present invention is to provide a tripod joint which is very simple and strong in construction and avoids practically completely internal friction.

The invention provides consequently a tripod joint of the aforementioned type, wherein each roller has a convex toric inner surface and a ring arrangement of rolling elements having a diabolo shape is interposed between the toric surface and the spherical surface of the corresponding arm.

Any rolling element retaining means is superfluous when, in accordance with an important feature of the invention, the inner shape of the element carrying the runways and the dimensions and the number of the rolling elements are so chosen that the large outside diameters of the rolling elements all abut one another so as to limit the movement of the rollers toward the free end of the arms. The rollers may have a large variety of outer shapes which ensure, in combination with the runways of the female element, that each roller is held in the plane of symmetry of the two associated runways.

BRIEF DESCRIPTION OF THE DRAWINGS

The invention will be explained hereinafter in more detail with reference to the accompanying drawings which represent only some embodiments. In the drawings.

DETAILED DESCRIPTION OF THE INVENTION

Figure 1:
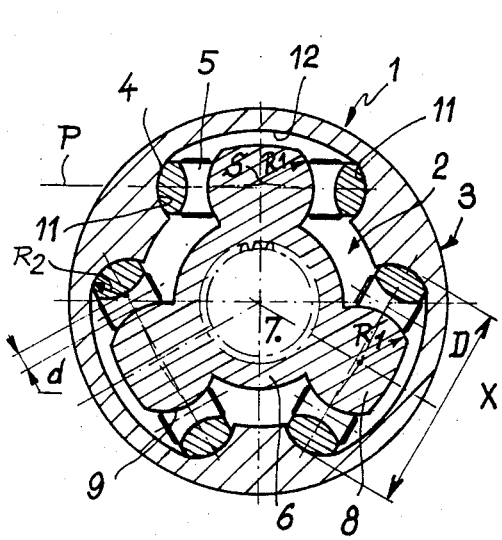
FIG. 1 is a cross-sectional view of a homokinetic joint according to the invention, assumed to be in a perfectly aligned position.
Figure 2:
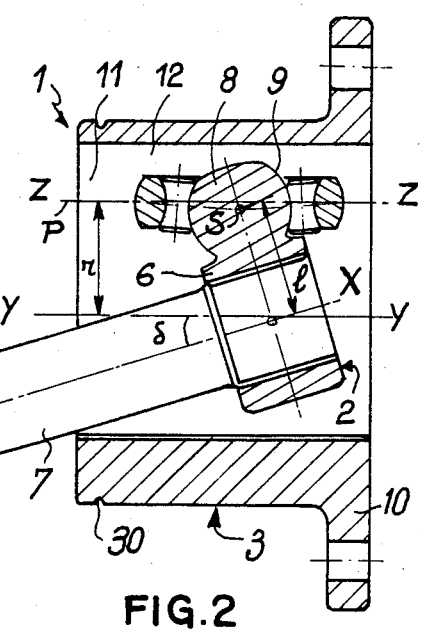
FIG. 2 is a longitudinal sectional view of the same joint operating at an angle.
Figure 3:
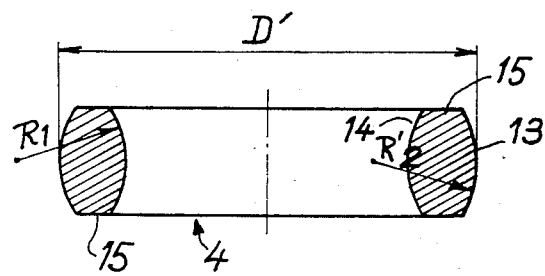
FIG. 3 is an axial sectional view, on an enlarged scale, of a roller of this joint.

The homokinetic joint 1 shown in FIGS. 1 and 2 is constituted solely by a tripod element 2, a barrel 3, three rollers 4 and three ring arrangements of rolling elements 5 each of which tapers from opposed end portions toward the centre of the rolling element thereby defining a concave curvilinear peripheral outer surface on the rolling element.

The tripod element 2 comprises a central hub 6 which is fixed to the end of a shaft 7 having an axis X—X. Extending radially outwardly from the hub 6 are three arms 8, each of which arms has a spherical portion 9 having a radius R1. The barrel 3 is a sleeve which has an axis Y—Y and is open at both ends and in which the tripod element 2 is received. It is provided, at the end thereof opposed to the shaft 7, with an outer flange 10 for fixing the barrel to a second shaft (not shown).

Internally, the barrel 3 comprises three pairs of confronting runways 11. Each runway 11 has a rectilinear axis Z—Z and a section in the shape of an arc of a circle of radius R2. If D designates the maximum distance between the runways 11 of the same pair, there is preferably chosen $R2 < D/4$. The radially outer ends of the runways 11 of the same pair are interconnected by a cylindrical sector 12 whose radius is distinctly greater than R2, and their axes Z—Z are located in a plane P which is located at a distance r from the axis Y—Y of the barrel.

A roller 4 is radially trapped in each pair of runways 11. The roller 4 has a relatively flat annular shape with a convex toric outer peripheral surface 13 whose maximum diameter D' is very slightly less than D and a generatrix radius $R'2$ very slightly less than R2. The inner peripheral surface 14 of the rollers 4 is also of a convex toric shape with a generatrix radius equal to R1. Axially, the rollers 4 are limited by two planar surfaces 15 whose distance apart is less than the length of the spherical surface 9 of the arms, measured along the axis of these arms.

The rolling elements 5 have a generatrix radius substantially equal to R1, a length substantially equal to the thickness of the rollers 4 and are exactly inserted between the surface 9 of the arms 8 and the surface 14 of the rollers.

When the joint operates at an angle (FIG. 2), each roller 4 is maintained by two runways 11 in a plane P and the rolling of the rolling elements 5 on the surface 14 constrains the rolling elements to maintain their axes perpendicular to this plane P.

Further, the roller moves axially on the arm substantially without sliding. Indeed, with respect to an axial displacement a of the arm relative to the roller, the sliding m which would appear if the joint did not rotate would be:

$$m = aR1/(2R1+d)$$

in which d is the minimum diameter of the rolling elements 5. But, when the joint operates, the rolling elements continuously roll and swivel and this as it were eliminates the friction by a compound sliding and rolling effect. Indeed, it is found that the considered axial displacement occurs substantially without opposition.

In all tripod joints, it is necessary to prevent the rollers and the rolling elements of the tripod element from escaping before the insertion of the tripod element in the barrel and also when the joint operates under extreme conditions when a roller leaves the runways. In the joint 1 described hereinbefore, the rollers 4 and the rolling elements 5 are prevented from escaping in a particularly simple and advantageous manner without use of any additional axial retaining means.

Figure 4:
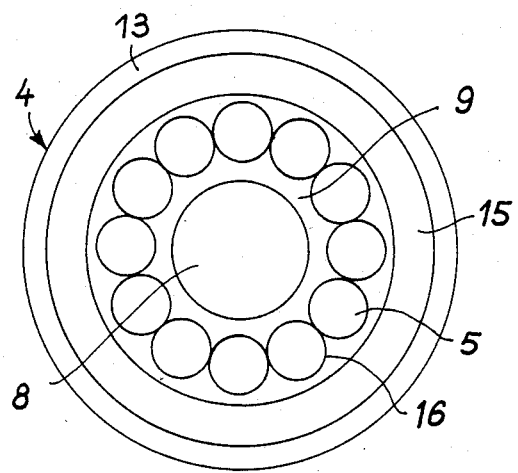
FIG. 4 illustrates the retention of a roller on the arm therefor.

Indeed, the circumferential clearance, ie. the sum of the gaps between the large diameters of the rolling elements, measured when the centre of the spere 9 of the arm passes through the plane of symmetry P of the roller, is so defined that the large diameters of the rolling elements are all in contact, as shown in FIG. 4, when the roller moves axially by a fixed value relative its arm, which prevents any greater axial displacement which would be liable to result in the roller escaping.

This circumferential clearance must be sufficient to permit the mounting of the rolling elements. It is found that the last rolling element must be mounted with application of force after a circumferential packing of the other rolling elements, by use of the elasticity of the parts to be assembled which are made from steel of high hardness.

Figure 5:
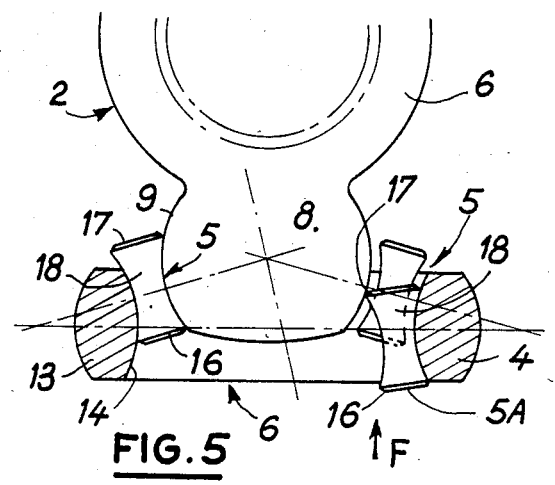
FIGS. 5 to 7 illustrate the mounting of a roller on the arm therefor, FIGS. 5 and 7 being axial sections of the roller and FIG. 6 being a view in the direction of arrow 6 of FIG. 5.
Figure 6:
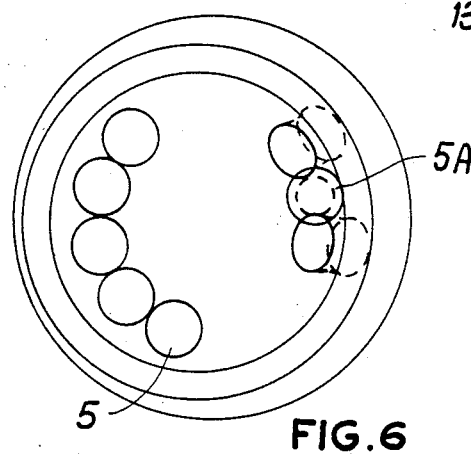
Figure 7:
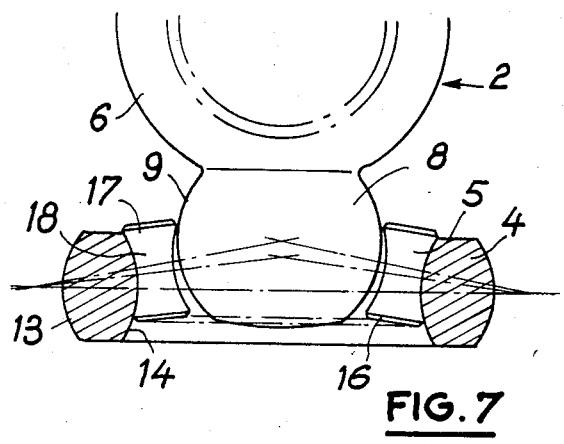

More precisely, it is possible to operate in the manner illustrated in FIGS. 5 to 7. With the roller 4 inclined relative to the axis of the arm 8 (FIGS. 5 and 6), all the rolling elements 5 except one, which has the reference numeral 5A, are placed in position along the surface 14, and their outer large diameters 16 are put in contact with each other (FIG. 6). The rolling element 5A can only be inserted slantwise by bringing its inner large diameter 17 in the narrowed region 18 of two adjacent rolling elements. An axial thrust F exerted in the direction of the arrow of FIG. 5 on the rolling element 5A and on the adjacent part of the roller 4 then produces a resilient circumferential packing of the other rolling elements and the resilient circumferential elongation of the roller and permits, after passing through a critical point, bringing the assembly to the normal position of operation shown in FIG. 7. The disconnection would then only be possible at the price of an axial force of the same order of magnitude as the force F, ie. much greater than the axial forces encountered in joint operation.

When the joint 1 operates at a break angle $\delta$ (FIG. 2), owing to the principle of the tripod connection, the rollers are moved relative to their neutral position a distance:

$$j = +3/2r(1-\cos\delta)$$

radially outwardly and a distance:

$$i = r/2((1/\cos\delta)-1)$$

radially inwardly of the joint.

There result axial offsets between the plane of symmetry of the roller 4 and the centre of the spherical region of the arm 8 or trunnion. These axial offsets may be rendered equal in respect of a given angle $\delta$ by choosing the distance l between the centre S of the spherical region 9 and the axis X—X of the tripod element larger than r so that:

$$i + \lambda = j - \lambda$$

or $$\lambda = (j-i)/2$$

For example, if r=20 mm and $\delta = 10°$, there are obtained j=0.455 and i=0.154 so that the compensation $\lambda$ would have for magnitude:

$$\lambda = (0.455 - 0.154)/2 = 0.150 \text{ mm}$$

Thus the equal inward and outward offsets would have a common magnitude:

$$p = 0.455 - 0.150 = 0.305 \text{ mm}$$

The compensation $\lambda$ has for consequence an increase in the radial clearance in the arm/roller connection, but this increase in clearance amounts to:

$$\rho = p2/(4R1+2d),$$

namely for R1=10.5 mm and d=4 mm, $$\rho = 0.305^2/(42+8) = 0.0018 \text{ mm},$$

namely $\rho < 2$ microns, which is quite acceptable.

Thus, owing to a slight outward offset $\lambda$ of the centre of the spherical region 9 relative to the plane P, there is obtained a good centering of the load on the rolling elements and a good distribution of this load along their generatrices, which results in a maximum torque transmitting capacity.

This is in addition to the other important advantages of the joint 1, which may be summarized as follows:

automatic alignment of the rolling elements in all cases, which ensures a free rotation of these rolling elements without jamming;

no axial retaining device for the rolling elements is necessary and the ends of the rolling elements can remain in the rough condition without precision in contrast to the conventional rolling bearings having rollers or needles, whence a simplification of the assembly, reduction in the number of fragile members, improvement in the reliability and lower production cost; and, swivelling and sliding of the rollers relative to the arms of the tripod element occurring substantially without friction, these two functions being ensured by the rolling elements owing to the fact that their sliding is hidden or eliminated by the simultaneousness of their rolling.

Figures 8, 9:
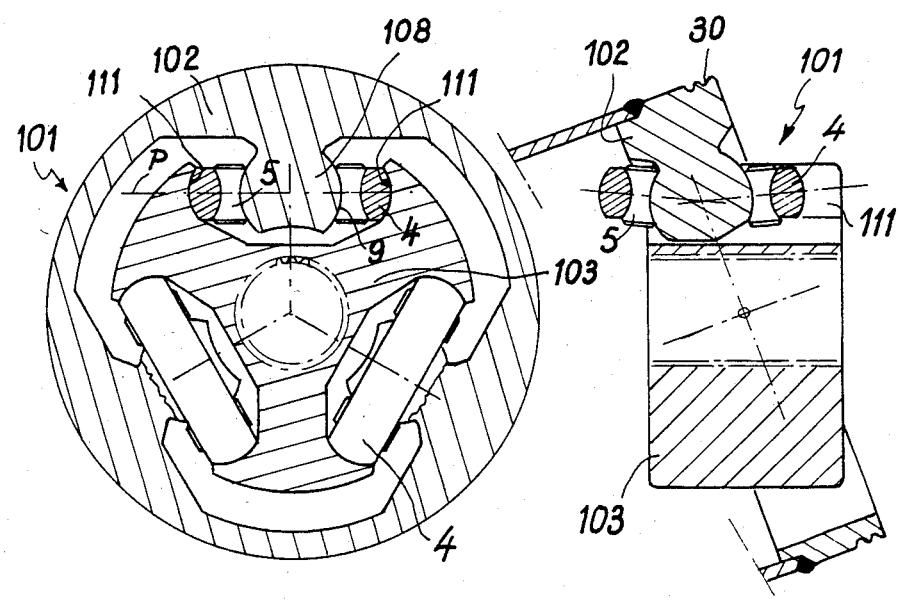
FIGS. 8 and 9 are views respectively similar to FIGS. 1 and 2 of a second embodiment of the joint according to the invention.
Figure 14:
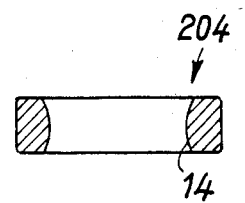
FIG. 14 is an axial sectional view of a roller of the joint shown in FIGS. 10 and 11 or of the joint shown in FIGS. 12 and 13.

The joint 101 shown in FIGS. 8 and 9 differs from that shown in FIGS. 1 and 2 by the fact that the tripod element 102 has the shape of a ring from which the arms 108, carrying the rollers 4 through the rolling elements elements 5, extend radially inwardly. In addition, the runways 111 are provided on the three branches of a section element 103 having a spider shape.

Figure 10:
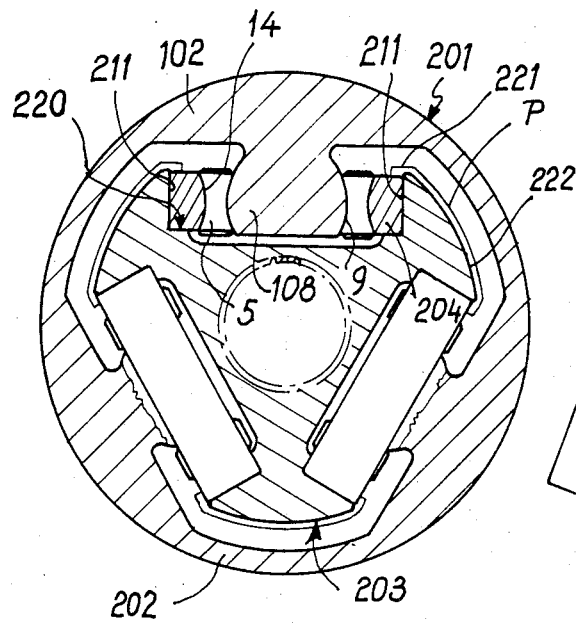
FIGS. 10 and 11 are views respectively similar to FIGS. 1 and 2 of a third embodiment of the joint according to the invention.
Figure 11:
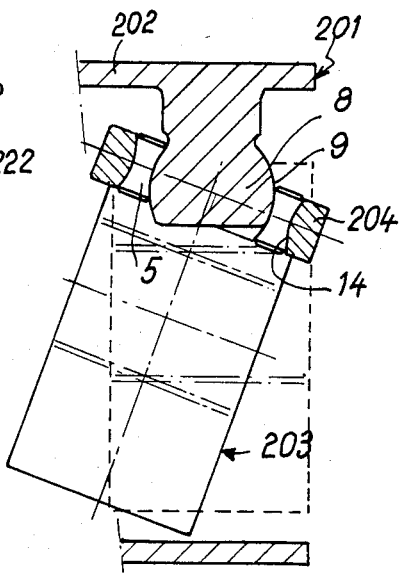

The joint 201 shown in FIGS. 10 and 11 differs from the preceding joint only in the manner in which each roller is maintained in its plane P. Indeed, each roller 204 has a cylindrical outer shape and the runways 211 are planar.

These runways are internally limited by a shoulder 220 of the branches of the spider member and externally by projecting flanges 221 of three plates 222 fixed to the ends of these branches.

Figure 12:
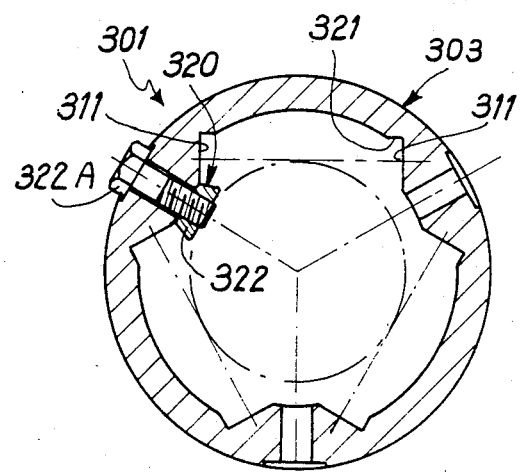
FIGS. 12 and 13 are respectively a cross-sectional view and an axial sectional view of the female element of a joint according to a fourth embodiment of the invention.
Figure 13:
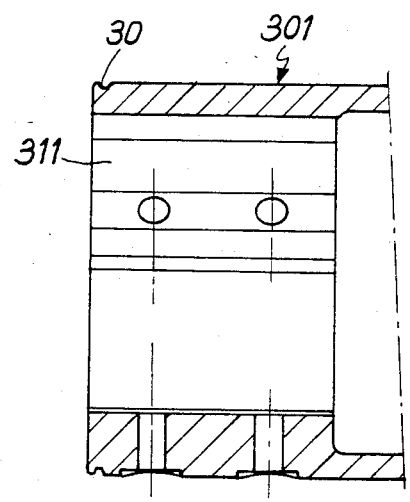

FIGS. 12 and 13 show a joint 301 which is a combination of the embodiment of FIGS. 1 and 2 and that of FIGS. 10 and 11. Indeed, the tripod element (not shown) is the same as in FIGS. 1 and 2 but carries three externally cylindrical rollers 204. The runways 311 of the barrel 303 are planar and strips 322, fixed by screws 322A between the adjacent runways of the adjacent rollers, provide the axially positioning inner surfaces 320 for each roller 204 in its plane P, the outer positioning surfaces 321 being formed by shoulders on the barrel bordering the runways 311.

Figure 15:
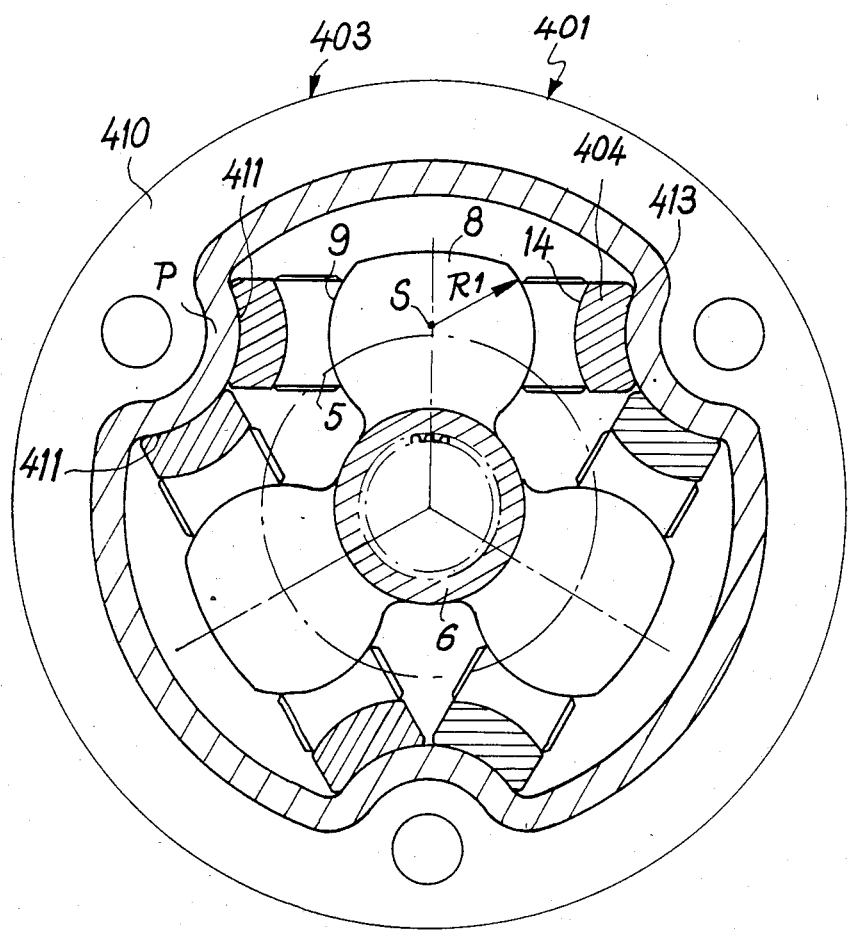
FIG. 15 is a cross-sectional view of a fifth embodiment of the joint according to the invention.

The joint 401 shown in FIG. 15 is generally similar to the joint 1 of FIGS. 1 and 2 except that each roller 404 has a concave toric outer surface 413 whose radius is roughly equal to R1 and rolls along cylindrical runways 411 which have a convex section. Each convex runway 411 may be advantageously the cylindrical extension of the contiguous runway 411 of the neighbouring roller. These runways may be easily produced by cold-forming the initially circular wall of the barrel 403 which was previously provided with an end flange 410.

The operation and advantages of the joints shown in FIG. 15 are the same as those of the joint 1 shown in FIGS. 1 and 2. In each embodiment, the outer element 3, 102, 202, 303, 403 is provided with an outer groove 30 at one end for anchoring the large end of a fluidtight bellows or gaiter (not shown) whose small end surrounds the shaft rigid with the other element of the joint. This bellows retains the lubricant and protects the mechanism contained therein.

All the joints illustrated in the drawings are of the sliding type, but it is also possible to envisage a similar mounting of the rollers on the arms of the tripod element in joints of the "fixed" type, ie. joints in which the tripod element is axially retained relative to the runway-carrying element.

Having now described my invention what I claim as new and desire to secure of Letters Patent is:

1. A homokinetic tripod joint comprising:
   a tripod element having three arms having radially extending axes, each said arm having a spherical surface;
   an element defining pairs of rectilinear runways;
   three rollers running in respective said runways, each said roller being mounted to swivel about said spherical surface of a respective said arm and to be movable axially of said respective arm, and each said roller having a convex toric inner surface;
   three ring arrangements of rolling elements, each said arrangement comprising a plurality of said rolling elements, each said rolling element having opposed end portions of maximum diameter, a center portion of minimum diameter and a peripheral surface having a concave curvilinear shape in an axial section of said rolling element between said opposed end portions thereof;
   said rolling elements of each said arrangement being interposed between said toric inner surface of the respective said roller and said spherical surface of the respective said arm for rolling contact therewith over the entire length of said peripheral surfaces of said rolling elements;
   said rolling elements of each said arrangement being positioned relative to each other circumferentially of the respective said roller and said arm such that, upon relative movement of said roller axially of said arm, end portions of said rolling elements abut circumferentially of said spherical surface and limit the extent of said movement of said roller axially of said arm; and
   a distance between the center of said spherical surface of each said arm and an axis of rotation of said tripod element is slightly greater than a distance between a plane of symmetry of the respective said pair of runways and an axis of rotation of said runway-defining element, said plane of symmetry extending through centers of said runways and extending parallel to said runway-defining element.

2. A joint according to claim 1, wherein each said roller has a toric outer shape and said runways have conjugate cross-sectional shapes.

3. A joint according to claim 2, wherein the radius of the generatrix of said outer surface of each said roller is less than one quarter of the outside diameter of the respective said roller.

4. A joint according to claim 2, wherein each said roller has a concave toric outer surface.

5. A joint according to claim 1, wherein each said roller is externally cylindrical and rollable along planar said runways provided with means for retaining said roller axially of the respective said arm.

* * * * *